April 23, 1968  A. HOZVEN  3,379,816
ELECTRODE SEALING DEVICE
Filed Jan. 6, 1966  2 Sheets-Sheet 1

INVENTOR.
ALBERT HOZVEN
BY Sherman H Barber
his Attorney

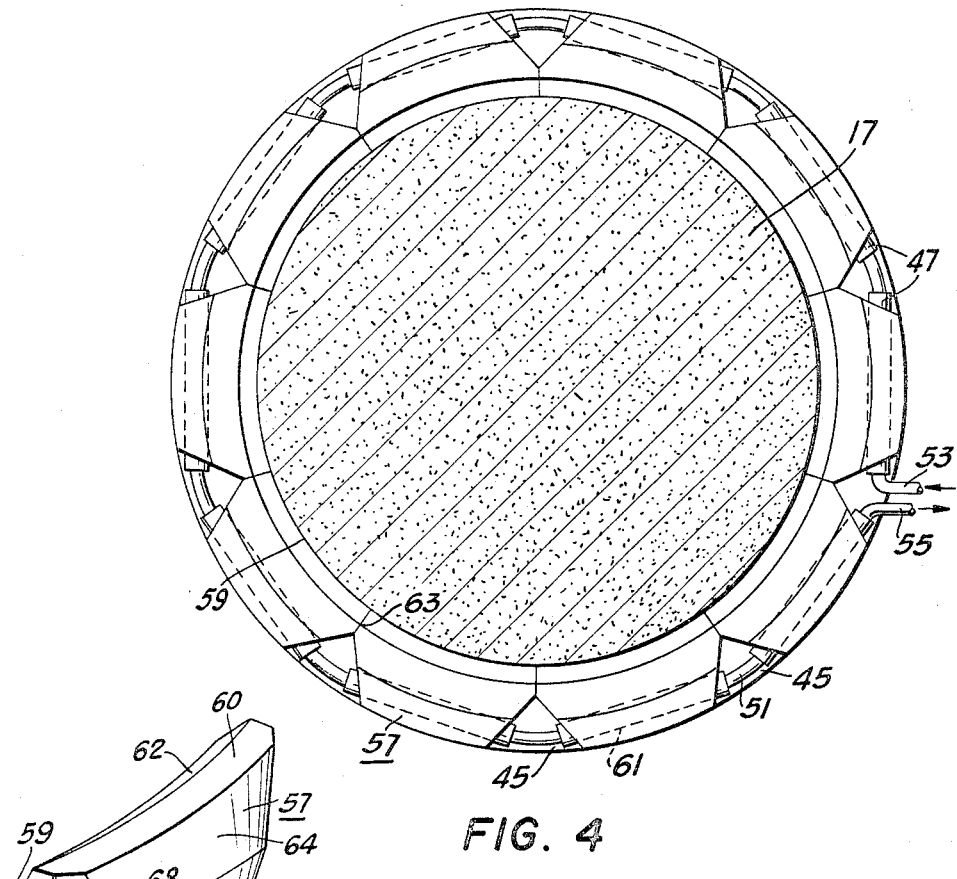
FIG. 4
FIG. 6
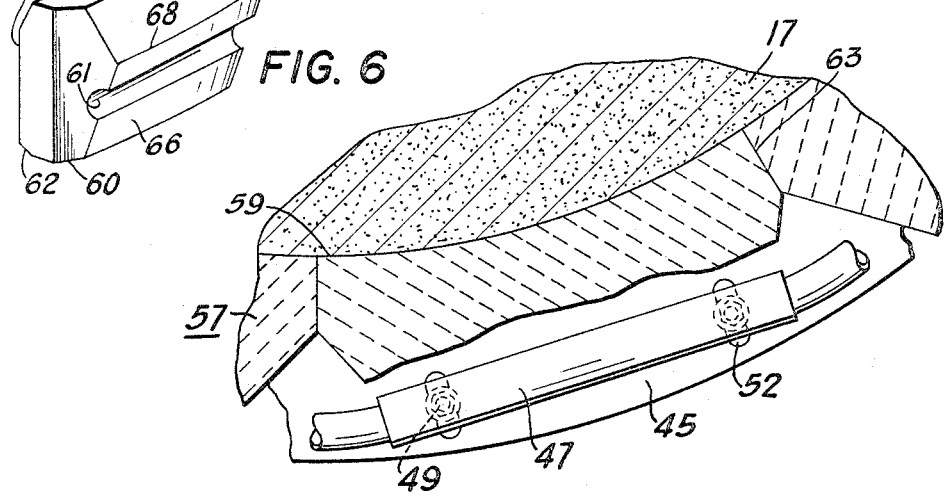
FIG. 5
INVENTOR.
ALBERT HOZVEN
BY Sherman H Barber
his Attorney

United States Patent Office 3,379,816
Patented Apr. 23, 1968

3,379,816
ELECTRODE SEALING DEVICE
Albert Hozven, Matanzas-Estado Bolivar, Venezuela, assignor to Koppers Company, Inc., a corporation of Delaware
Filed Jan. 6, 1966, Ser. No. 519,115
8 Claims. (Cl. 13—9)

This invention relates to steelmaking and more particularly to seals around the electrodes passing through the roof of electric arc furnaces.

An electric arc furnace is generally equipped with three cylindrical electrodes which pass through large circular openings in the roof of the electric furnace and which are arranged at the apices of an equilateral triangle. Each electrode is supported in a water cooled clamp mounted at the end of a horizontal cantilevered arm that is supported on a vertical standard or mast; the arm extending over the roof of the furnace so that the axis of the clamp is substantially in line with the axis of the circular hole in the roof of the furnace and with the electrode.

During the melting operation, the electrodes must be quickly raised and lowered for proper control of power consumption and for heat control within the furnace. For this reason, the holes in the roof of the furnace are somewhat larger than the electrode. A water cooled ring is generally placed around each electrode and over the roof opening to seal the heat within the electric arc furnace. Heretofore, considerable heat was lost through these holes, or through the annular space between the electrode and the hole, because the water cooled ring did not provide an adequate seal over the annular space.

In contrast to the prior art practice, the present invention comprises a plurality of end abutting shaped refractory elements surrounding the electrodes. Each refractory element is pivotable so that it gravitates into surface contact with the electrode no matter whether the electrode moves vertically, downwardly, or horizontally, and all elements cooperate to provide a heat seal around the electrode.

For a further understanding of the present invention and for advantages and features thereof, reference may be made to the following description taken in conjunction with the accompanying drawings, which show for the purpose of exemplification a preferred embodiment of the invention.

In the drawings:

FIG. 4 is a view along line IV—IV of FIG. 3;

FIG. 5 is a view along line V—V of FIG. 4; and

FIG. 6 is a schematic perspective view of a refractory element.

Figure 2:
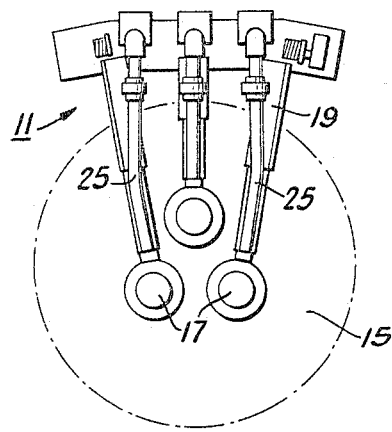
FIG. 2 is a plan view of the furnace of FIG. 1.
Figure 1:
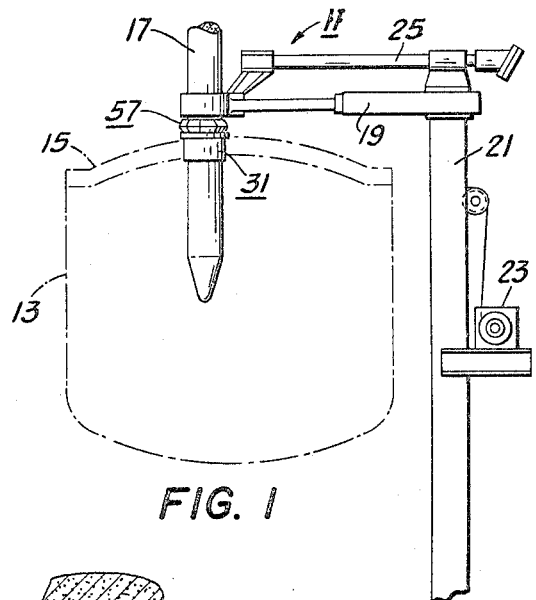
FIG. 1 is a schematic view of an electric arc furnace incorporating the present invention.

FIG. 1 illustrates a typical electric arc furnace arrangement 11 comprised of a furnace proper 13, a roof 15, and a plurality of electrodes 17 that are supported in a vertical position over the furnace 13 by cantilevered horizontal arms 19 mounted to vertical standards or masts 21.

The electrodes 17 may be raised and lowered in the usual manner by means of conventional hoisting mechanism 23, and electric current may be delivered to the electrodes by means of conventional electric power cables 25. Each electrode 17, as may be noticed from FIG. 3, passes through an aperture 27 in the roof 15; the aperture being somewhat larger in diameter than the diameter of the electrode 17 thereby forming an annular space between the electrode and the wall of the aperture.

Figure 3:
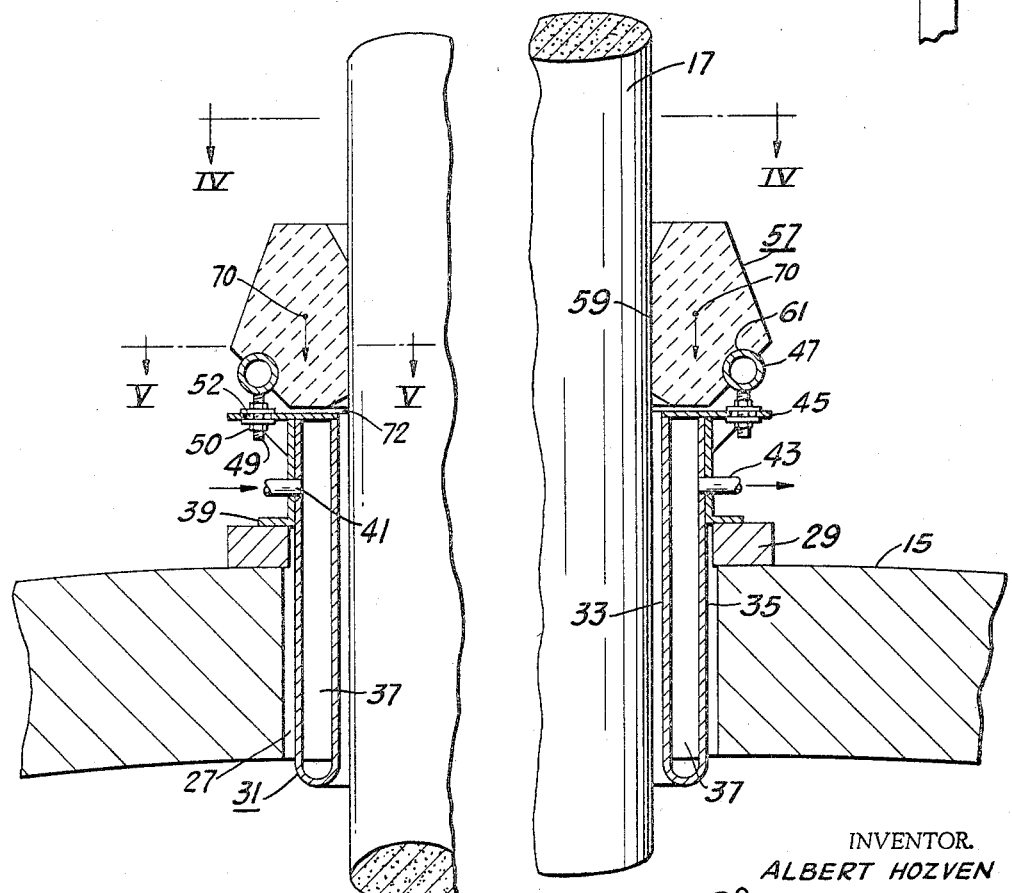
FIG. 3 is a vertical sectional view through one of the electrodes taken at the roof of the furnace.

Surrounding each electrode 17 is a base ring 29 which is made of refractory material preferably, and which is attached to the top of the roof 15 in any suitable and convenient manner. The base ring 29 provides a suitable support for a water cooled structure, such as a conventional type of water jacket 31, having inner 33 and outer 35 concentric walls that are joined together at the top and bottom, and vertical spaced apart internal baffles 37, about as shown in FIG. 3.

The water jacket 31 is also provided with a horizontally extending support ring 39 which, in the embodiment shown, is one leg of an angle member that is curved and is welded to the outer wall 35. The water jacket 31 is also provided with a cooling water inlet conduit 41 and a cooling water outlet conduit 43; the cooling water, of course, flowing circuitously in the several baffled chambers within the water jacket 31.

Around the top of the water jacket 31 is a horizontal circular platform 45 that has an outer diameter which is somewhat greater than the diameter of the outer wall 35; the platform may be fixed by welding or in any other suitable manner to the water jacket 31. The inner diameter of the circular platform 45 is preferably the same as the diameter of the inner wall 33. The water jacket 31, however, does not completely seal the gases from escaping between the electrode 17 and the outer surface of the water jacket. In accordance with this invention, a plurality of refractory members 57 are arranged around each electrode to effect a gaseous seal. These refractory members 57 rest on tubular members 47 and bear against electrode 17 as well as against adjacent refractory members.

The platform 45 supports a plurality of individual tubular members 47 which are arranged like the sides of a polygon (see FIG. 4) and which are individually supported upon stools which may take the form of a bolt 49 and nuts 50 that fit in elongate slots 52 in the circular platform 45. Thus, the several straight tubular members 47 may be moved and fixed in a horizontal position by moving the bolts 49 in the slots 52, and also in a vertical position by varying the location of the nuts 50 on the bolts 49.

Because the individual tubular members 47 are adjustable in a horizontal as well as a vertical direction, it is necessary that they be connected by short flexible arcuate conduits 51, as shown in FIG. 4. There is also provided a fluid inlet conduit 53 and a fluid outlet conduit 55 to introduce and discharge cooling fluid to the several connected water cooled members 47.

A plurality of the refractory members 57, FIG. 6, each having a block-like form, surround the electrode 17. Each refractory member has a generally polygonal cross sectional shape, FIG. 3, that includes vertical arcuate surface 59 which conforms to a portion of the surface of the electrode.

From FIGS. 3 and 6 it will be noticed that each refractory member 57 has a generally polygonal cross sectional shape and that each refractory member comprises a segment of a sealing collar which surrounds each electrode 17.

Each refractory segmental member 57 has a vertical arcuate inner surface 59 that conforms to a portion of the surface of the electrode 17; that is to say, the radius of curvature of the surface 59 is substantially the same as the radius of the cylindrical electrode 17. Each refractory member also has spaced apart top and bottom horizontal surfaces 60 which are connected to the vertical arcuate surface 59 by means of sloping conical surfaces 62, and, as shown in FIG. 6, each refractory element 57 also has a downwardly sloping surface 64 and upwardly sloping conical surfaces 66 which intersect in a circular trace 68.

It is also desirable to chamfer the ends of the refractory members, as shown in FIG. 4, so that there is a vertical radial planar surface at each end of each refractory member that abuts a similar radial planar surface of an adjacent refractory member. It will be noticed from FIGS. 3 and 6 that the refractory elements 57 also has a semicylindrical straight groove 61 in the lower outer conical surface 66 which groove conforms in size to the tubular members 47.

Thus, the refractory members 57 may be arranged around the electrode 17 in such a way that each refractory member is supported on the tubular member 47, which cooperates with the groove 61, and that the arcuate surface 59 bears against the surface of the electrode 17. Further, it should be noted that the tubular members 47 provide pivotal supports for the refractory members 57 and that the curved surfaces 59 are maintained continually in contact with the surface of the electrode, because the center of gravity 70 (see FIG. 3) of each refractory element 57 lies on a line that is between the tubular member 47 and the surface of the electrode 17. Hence, the weight of the individual refractory members causes each one to pivot about a respective tubular member 47 and to bear against the surface of the electrode 17. Moreover, the refractory members 57 are so formed and arranged that when they are placed in end abutting relation as at 63 (see FIG. 4), they provide a heat seal both at the electrode surface and at the abutting ends of the respective refractory members.

It should be understood, however, that there is some flexibility in the size and shape of the refractory members. It should be understood that it is undesirable that there is excessive pressure against the electrode surface such as would unnecessarily wear the electrode 17. But, there should be sufficient pressure to resist upward pivoting of the refractory members by the hot gases which tend to escape from the furnace and which would destroy the seal.

The width of the space or gap 72 between the bottom of the refractory members 57 and the circular platform 45 is adjustable so that the refractory members 57 may pivot into a sealing contact with the electrode as it moves upward and downwardly, and sometimes horizontally. The width of gap 72 may, of course, be varied by regulating the height of the tubular members 47 above the platform 45; this regulation being quickly and easily accomplished by adjusting the position of the nuts 50 on the bolt 49.

A feature of the present invention is the adjustable water cooled support 47, 49, 50, 52 for each of a plurality of refractory members 57 which pivotally gravitate into a sealing relation with the surface of the electrodes 17 and thus provide an effective heat seal at the aperture 27 in the roof 15 of an electric arc furnace 11. Such a sealing arrangement makes possible a continuous adjustable seal even though the electrode is moved both upward and downwardly frequently during the operation of the furnace. Further, such a seal is continuous even when the electrode moves horizontally, as it does occasionally during the operation of the furnace. There will be a continuous seal at the aperture 27 because each refractory member individually pivots and gravitates into continual surface contact with the electrode. Moreover, the pivotable refractory members 57 may be easily removed and replaced at minimal expense and with a minimum of lost time whenever it becomes necessary.

Another feature of the present invention is that the heat seal provided by the refractory members is effective to eliminate the damage caused by the hot gases escaping from the present type of electrode seals; such damage being excessive to rubber hoses, electric cables, flexible connections, and the like that are usually found atop an electric furnace.

Although the invention has been described herein with a certain degree of particularity, it is understood that the present disclosure has been made only as an example and that various modifications and changes may be made within the scope of the invention as defined by the appended claims.

What is claimed is:
1. An electric arc furnace comprising:
 (a) a refractory lined shell adapted to contain metal;
 (b) a roof covering said shell and having therein a plurality of apertures;
 (c) a plurality of electrodes passing through said apertures and forming annular spaces between said electrodes and the walls of said apertures;
 (d) means supporting said electrodes substantially in axial relation to said apertures;
 (e) means to raise and lower said electrodes with respect to said refractory lined shell;
 (f) a base ring surrounding each said aperture and mounted to said roof;
 (g) a water jacket surrounding each said electrode and disposed in each said annular space;
 (h) means fixing said water jackets relative to said apertures;
 (i) a platform mounted to each said water jacket and extending outwardly therefrom;
 (j) a plurality of tubular members adjustably mounted to each said platform;
 (k) conduit means connecting said tubular members whereby cooling fluid flows in the tubular members surrounding each said electrode; and
 (l) a plurality of refractory elements disposed around each said electrode in abutting relation, said elements being pivotally mounted on said tubular members whereby each refractory element individually pivotally gravitates against said electrode and such elements collectively seal the annular space between each electrode and the aperture through which said electrode passes.

2. In an electric arc furnace having a plurality of electrodes passing through apertures in the roof of said furnace, the improvement comprising:
 (a) a plurality of support members mounted in said roof and disposed around each said electrode;
 (b) a plurality of preformed members adapted to engage an electrode and disposed around each said electrode, said members being arranged in end abutting relation and pivotally mounted to said support members with their individual centers of gravity being between the support members and the electrode, whereby said elements gravitate individually toward and bear against said electrode, and said elements collectively seal the aperture through which each electrode passes.

3. The invention set forth in claim 2 wherein:
 (a) said support members are adjustable vertically with respect to said roof.

4. The invention set forth in claim 2 wherein:
 (a) said support members are adjustable horizontally with respect to said electrodes.

5. In an electric arc furnace including one or more cylindrical electrodes that annularly pass through respective one or more apertures in the roof of said furnace, and a plurality of cylindrical support members mounted to said roof and disposed around each one of said electrodes, a seal covering the annular space between said electrode and the respective aperture in said roof comprising a plurality of end abutting members each pivotally mounted to respective support members and including:
 (a) a cylindrical surface that is substantially cooperative with a portion of the surface of said electrode;
 (b) first and second spaced apart conical surfaces connected to said cylindrical surface edges;
 (c) spaced apart planar first and second surfaces connected to the free edges of said first and second conical surfaces;
 (d) third and fourth conical surfaces connected to the free edges of said first and second planar surfaces and intersecting in a circular trace, said third conical surface having therein a straight cylindrical groove adapted to cooperate with a respective cylindrical support member, said groove being so disposed that the center of gravity of said end abutting member is between said groove and said cylindrical surface.

6. The invention set forth in claim 2 wherein:
(a) said support members are water cooled.

7. The invention set forth in claim 2 wherein:
(a) said support members are arranged concentrically with respect to each said electrode; and
(b) said preformed members are so mounted on each said support member that the center of gravity of each said preformed member lies between said electrode and said support member.

8. The invention set forth in claim 2 wherein:
(a) said preformed members are so mounted on said support members that the center of gravity of each said preformed member is between said support member and said electrode whereby each said preformed member gravitates about said support member as an axis toward said electrode; and
(b) adjacent preformed members are disposed in abutting relation and said members collectively seal the annular space between said electrode and the roof through which said electrode passes.

References Cited
UNITED STATES PATENTS

| | | | |
|---|---|---|---|
| 1,363,815 | 12/1920 | Saklatwalla et al. | 13—16 |
| 1,732,431 | 10/1929 | Bruggmann | 13—17 |
| 2,718,537 | 9/1955 | Basler | 13—17 |

FOREIGN PATENTS

| | | |
|---|---|---|
| 561,710 | 8/1958 | Norway. |

BERNARD A. GILHEANY, *Primary Examiner.*

H. B. GILSON, *Assistant Examiner.*